United States Patent Office 2,743,003
Patented Apr. 24, 1956

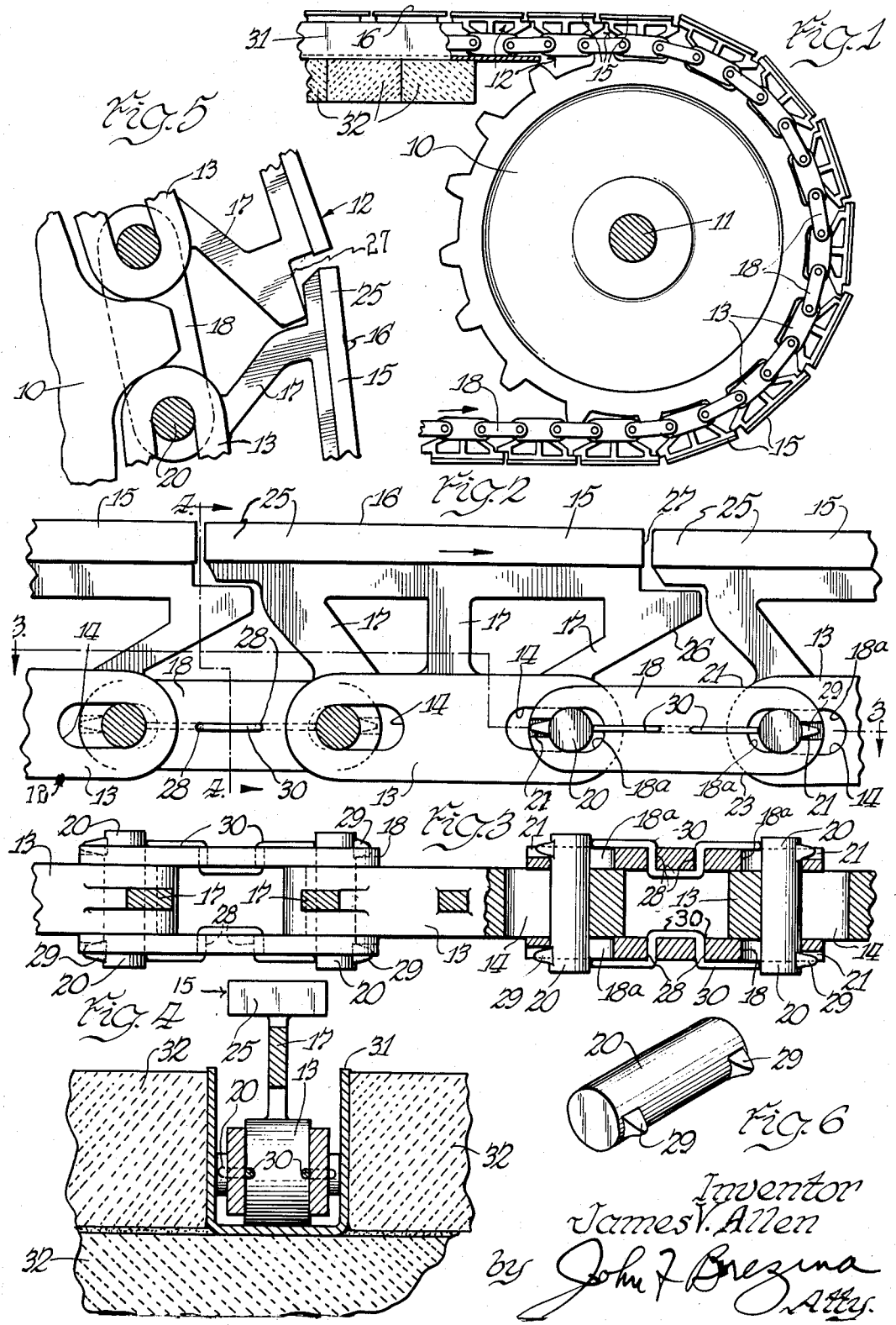

2,743,003

CONVEYOR CHAIN FOR USE IN HEAT TREATING FURNACES

James V. Allen, Chicago, Ill.

Application January 2, 1953, Serial No. 329,303

3 Claims. (Cl. 198—189)

My invention relates to improvements in conveyor chains, and particularly to the type of conveyor chains adapted for use in heat treatment of steel and other metals.

In presently known conveyors the conveyor chains used in the heat treatment of metals where relatively high heat is encountered, are frequently broken and distorted and other damage is caused by the constant subjection thereof to high temperatures which are necessarily maintained in heat treating furnaces. In these cases there has been a very considerable and disproportionate amount of "takedown" time and frequent and relatively long repair and replacement time, during which periods the heat treating furnaces are out of production and additionally there is the great loss of labor time both of the employees who make the repair or replacement as well as waiting time of those who normally work in connection with the furnace operation. One of the causes of frequent breakage of the links of such conveyor chains is that the side links and connecting bars connected by such links are subjected to heats ranging up to 2,000 deg. F. The metal materials being heat treated are normally placed upon the upper run of a pair of such parallel conveyor chains suitably power driven and consequently the blasts of heat, which is usually combustible gas, are directed against the materials being treated which are supported and moved slowly on the conveyor chains through the tunnel-like furnace. In these instances the upper portions of the side links and of the connecting bars are heated to substantially higher temperatures along their normally upper areas (when on the upper run of the endless chain) than is the case as to the lower portions of such side links and bars; and secondly, when the links of the chains pass outwardly through the outlet or the delivery end of the furnace they travel around suitably journalled sprockets and downwardly in return travel in the lower part of the furnace. The variations of relatively high temperatures aforesaid as well as the constant repetitious increase and decrease of temperature of the conveyor chain links results in relatively frequent breakage, crystallization and distortion so as to make frequent tedious repair and replacement of the links necessary.

It is, therefore, an important object and accomplishment of my invention to provide novel conveyor chains and novel links therefore having relatively thick and strong work-supporting members formed integral with the chain links and which extend substantially above said links and which have a plurality of relatively large transverse openings or passages therein to reduce the rate and degree of conductivity of heat from the upper metal-engaging portions to the links themselves; and which said metal-supporting members have integral forwardly extending projections on flanges and rear end recesses whereby such projections or flanges will overlie and nest in the rear recesses respectively of adjacent members so as to present, in the upper run of each endless chain, a substantially continuous and level work-supporting face.

A further object of my invention is the provision of a conveyor chain for use in heat treating furnaces in which the spaced apart transversely passaged links each have an integral upwardly projecting flat-faced member for supporting the material to be treated during its travel throughout a heat treating furnace, and wherein such members have interfitting overlapping end portions which separate during the travel thereof around the driving sprockets, and in which members the metal-engaging faces lie in a substantially common plane and provide a substantially continuous surface on which the materials to be treated are positioned and without opportunity for such materials to become caught or impinged between the adjacent end portions of adjacent links.

Other and further objects of my invention will be apparent from the following description and appended claims:

Fig. 1 shows a side elevation of one of the driven end sprockets on which a section of an endless chain embodying my invention is mounted, the chain being shown as broken away.

Fig. 2 is an enlarged elevation of a short section of said chain and showing broken away parts of two of the connecting bars, and at the left thereof showing one side link removed and with the connecting pins in cross section.

Fig. 3 is a top plan view of a short section of my conveyor chain, and at the right showing a cross section of links and connecting bars, and taken substantially on the line 3—3 of Fig. 2.

Fig. 4 is an enlarged cross sectional view taken on a plane indicated by line 4—4 of Fig. 2.

Fig. 5 is an enlarged fragmentary elevation of a portion of the sprocket and showing the typical position of the end portions of adjacent bars partially separated when moving about such sprocket.

Fig. 6 is an enlarged perspective of one of the locking pins.

As shown on the drawings:

Referring to Figs. 1, 2 and 3, numeral 10 designates a toothed sprocket which is secured upon a suitably journalled and driven shaft 11, there being two such sprockets 10 secured on each shaft 11 in spaced apart relation. Shaft 11 is adapted to be driven by power means, not shown, at the desired, though relatively low speed, according to the speed of travel desired of the conveyor chains.

In each heat treating furnace of the tunnel type, two of the conveyor chains, generally designated as 12, are mounted on two pairs of parallel and aligned sprockets 10 and with the chains 12 in the desired spaced apart relation according to the usual sizes of the articles to be supported and moved during the heat treating process.

Numeral 13 designates metal inner links or bars, each being of substantial width as illustrated in Fig. 3, and which has a pair of elliptical transverse openings or passages 14 (see Figs. 2 and 3). Said links or bars 13 are preferably formed of steel having a high heat resistance property. Numeral 15 designates a work or material-supporting member having a flat face 16 and which is connected to and formed integral with the inner link 13 by a plurality of integral connecting ribs or webs 17, three thereof being illustrated in the drawings. Said ribs are centrally disposed in relation to the inner links or bars 13 and are relatively narrower than such bars 13 and the members 15, as illustrated in Fig. 4.

Numerals 18 designate metal connecting bars or side links each of which has a pair of relatively large holes or apertures 18a in the ends thereof. As illustrated in Fig. 3, two of said side links 18 are normally mounted against the opposite side faces respectively of each two substantially adjacent connecting bars 13, the same being removably connected to the adjacent ends of each pair of adjacent bars 13 by cross pins 20, one of which is shown in perspective in Fig. 6. Said pins 20 are normally mounted in the registering end passages of bars 13 and the end holes of side links 18.

As illustrated in Figs. 2 and 3, each of the side links 18 has a pair of opening recesses 21 on its opposite ends, one being at each end of said side links.

It will be noted that each of the pins 20 has formed on the opposite ends thereof, a pair of angularly extending integral lugs or projections 29 adjacent the ends thereof respectively.

Each of said side links 18 has a pair of spaced apart transversely extending passages 28 inwardly of its opposite ends respectively, as illustrated in Figs 3 and 4.

As shown in Figs. 2 and 3, each of the side links 18 has an end opening recess 21 formed in each end portion thereof and which recesses open to the normally outside face of the link and extend from each of the elliptical holes to the rounded ends of each link. These recesses receive the lugs 29 of pins 20 to prevent rotation of pins 20 and prevent longitudinal shifting of such pins in normal operation.

A U-shaped locking key or pin 30 is removably mounted in each pair of passages 28 and the free or leg portions thereof are bent in opposite directions from the central part of the inner link 13 and substantially at right angles to the portions of said locking pins which are in the passages 28 and so that such bent over portions or legs normally lie adjacent the link 13 and with their ends abutting the end portions of the respective cross pins 20 as shown in Fig. 3. The engagement of the ends of the legs of locking pins 30 with cross pins 20 prevent the cross pins from moving inwardly of the inner links 13, as the holes 18a are oval-shaped or elliptical to permit insertion of pins 20. Thereby the respective lugs 29 are maintained in recesses 21 of side links 18 during movements of the chain, said lugs 29 preventing longitudinal shifting movement of pins 20 during normal operation.

When assembling the conveyor chain, after two of the inner transversely passaged bars or links 13 are positioned in spaced apart aligned position, two of the side links 18 are placed and temporarily held with their respective end holes in register with the transverse passages 14 of two of the bars 13. Thereupon two of the pins 20 are inserted through the elliptical hole 18a and through the oval shaped passages 14. Said pins and their end lugs 29 are of a size permitting such insertion, and such pins 20 are thereupon portably rotated and pushed to the outer ends of link holes 18a to thereby seat the lugs 29 in said recesses 21 of links 18 respectively, as illustrated at the right of Figs. 2 and 3.

The two spaced apart bars 13 are pulled apart a short distance to cause the cross pins 20 to be disposed in the outer end portions of the elongated holes or passages 14 of each inner bar 13.

In order to maintain said links and bars in connected position and to maintain the pins 20 in desired position and against longitudinal shifting movements during normal work operations, two of the locking pins or keys 30 are thereupon inserted in the two passages 28 of each side link, and the outer leg portions of each thereof are bent over with a suitable tool in opposite directions and adjacent the side faces of side links 18, as shown in Figs. 2 and 3. In such bent over positions, the ends of keys 30 abut the end portions of pins 20 respectively and prevent the same from movement toward the center of side links 18.

As illustrated in Figs. 1, 2, 4 and 5, each of the material-supporting members 15 has an integral forward projection or nose 25 formed thereon and extending in the direction of the travel of the endless conveyor chain. Each of the bars or inner links 13, at the area of the normally rearmost rib 17, has an integral projecting lug 26 whose upper face is normally just below the plane of the lower face of the nose 25. Each of the work-supporting members 15 has a rear recess 27 formed therein which extends the full width of the member 15 and which is partially defined by the upper face of the projection 26.

As illustrated in Figs. 1 and 2, the forward projection or nose 25 of one bar 13 overlies and partially seats in the recess 27 of the member 15 in front of it when a section of the conveyor chain is traveling in substantially straight path, and the space between the forward end of each said projection 25 and the rear end of the adjacent member 15 is relatively small, and substantially smaller than the size of any normal material or work normally positioned on a pair of such conveyor chains. Thereby, a substantially continuous and aligned supporting surface is presented by the aligned upper faces of the respective members 15 which are in the upper run of an endless chain.

It is to be understood that it is desirable to provide a suitable track means for the upper run of the chain (which extends substantially from the upper portions of one end sprocket to the other end sprocket of the same chain). I have illustrated one preferred form of such members which not only provides a supporting track in which the upper run of the chain slides and travels, but also provides a substantial degree of protection from the blasts of flame and heat which are normally directed from points adjacent the side walls of such heat-treating furnaces.

In Fig. 4, I have shown a cross section of a fragment of a relatively deep metal channel 31 of width greater than the widest dimension of one of said chains, and of a depth less than the normal height of one of said chains so that the upper material-carrying and supporting members 15 and a portion of the integral ribs 17 project above the edges of the flanges of channels 31 and above the adjacent fire bricks which are designated as 32, only fragments thereof being illustrated. It will be understood that a series of said fire bricks 32 are mounted in a conventional manner in a straight line and upon a suitable supporting surface or upon the normal bed of the interior bed of the furnace and so that the guides and supporting channel and track 31 will be supported to the desired height and so that the upper run of an endless chain will not sag and will travel in a straight path.

Additional rows of fire brick or equivalent heat-resistant elements 32 are suitably mounted along the two sides of each of the channels 31, as illustrated in Fig. 4, so that the protecting side rows of said fire brick will partially shield the channel 31 and the greater portion of the endless chain traveling in said channel and so that thereby the principal mechanical parts of the endless chain, especially the connecting side links, the inner bars and the connecting pins will not be subjected to as high temperatures as would be the case if said chain were completely exposed.

As mentioned previously, the novel structural feature of the ribs 17, which are relatively narrower and thinner than the transverse dimensions of the inner links or bars 13 and the material-carrying platform or member 15, substantially minimizes the conduction of high heat from the material-carrying members 15 which are exposed to direct high heat blasts. Thereby, while the inner bars or links 13 absorb some heat from the surrounding air and a limited amount through the ribs 17, said links 13 and side links 18 will not attain a temperature so high as to distort and damage the same within a relative long period of time. While the upper material-carrying members 15 will in some cases, become distorted, cracked or damaged by heat after a substantial time, my construction provides material-carrying members which will last many times longer than any other type of conveyor mechanisms presently used.

Additionally, my described construction provides for relatively quick and easy disassembly of any portion of such endless chain, this being accomplished by either bending upwardly or breaking off the bent over leg portions of keys or pins 30 and removing the same from the holes 28; thence moving upwardly and toward each other, the cross pins 20 of the particular side links desired to be moved, and withdrawing such cross pins to disconnect the side links and any two closest together inner bars 13. It will be understood that any one or more of the inner bars 13 may be removed in a similar manner and quickly and easily replaced by remounting either the same or new side links 13, reinserting the appropriate cross pins 20 and keying them in position against shifting movement as before described.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. A chain link construction for conveyors adapted for use in heat treating furnaces comprising a plurality of metal inner links, each of said links having transverse passages, adapted to receive connecting pins; means for pivotally connecting the apertured ends of two adjacent links; a pair of upwardly and outwardly extending metal ribs formed integral with the central portion of said link; a metal flat faced material-supporting member formed integral with the outer end portions of said ribs and connecting said ribs; said material supporting member being relatively wider than said ribs and having its ends extending substantially beyond the end portions of said link; said member having a recessed abutment at one end and a projecting nose at its opposite end, the said nose being normally positioned in the recess of the adjacent link; the outer faces of said material-supporting members providing a substantially continuous surface during the normal run of a chain composed of a plurality of said pivotally connected links.

2. In a conveyor chain, a pair of links having the end portions transversely apertured, the opposite apertured end portions of said links being substantially spaced from each other, connector bars; means for pivotally connecting one end of each of said links to one end of said connector bars; a plurality of ribs formed integral with each of said links and extending outwardly and substantially beyond the pivotal connection of said links; a substantially enlarged flat faced material-carrying member formed integral with the ribs of each of said links, each of said material-carrying members having abutments projecting beyond the opposite end of said link, one of said abutments having a recess therein, the opposite abutment of the adjacent link being adapted to be positioned on said recess during travel of said connected links, said last-mentioned engagement thereby providing a substantially continuous and aligned material-supporting face.

3. In a conveyor chain, a pair of links having their end portions transversely apertured, the opposite apertured end portions of said links being substantially spaced from each other, means pivotally connecting the spaced apart apertured portions of said links; a plurality of ribs formed integral with each of said links and extending outwardly and substantially beyond the pivotal connections of said links; a substantially enlarged flat faced material-carrying member formed integral with the normally upper portions of said ribs of each of said links, each of said material-carrying members having abutments projecting beyond the ends of said link, one of said abutments having a recess therein, the abutment at the opposite end of each said link normally projecting over and overlying said pivotal connecting means, the projecting abutment of one link being normally positioned in the recess of an abutment of the adjacent link whereby the inter-engaging surfaces of said adjacent abutments of the adjacent links normally overlie the middle area between two adjacent points of pivoting said last-mentioned engagement thereby providing a substantially continuous and flat material-supporting face.

References Cited in the file of this patent

UNITED STATES PATENTS

| | | |
|---|---|---|
| 1,825,107 | Wean | Sept. 29, 1931 |
| 1,971,553 | Fisk | Aug. 28, 1934 |